United States Patent
Manlove et al.

[19]

[11] Patent Number: 6,133,728
[45] Date of Patent: Oct. 17, 2000

[54] CURRENT MODE DIFFERENTIAL TO SINGLE-ENDED CONVERSION CIRCUIT FOR A MAGNETIC WHEEL SPEED SENSOR

[75] Inventors: Gregory Jon Manlove; Mark Billings Kearney, both of Kokomo, Ind.

[73] Assignee: Delco Electronics Corporation, Kokomo, Ind.

[21] Appl. No.: 09/080,384

[22] Filed: May 18, 1998

[51] Int. Cl.[7] .............. G01P 3/488; G01P 3/489; H03L 5/00; G01R 15/08

[52] U.S. Cl. .............. 324/166; 324/173; 327/308

[58] Field of Search .................. 324/166, 173, 324/160, 163, 207.15, 207.25; 327/100, 306, 308, 355, 516; 341/15, 139; 455/249.1; 123/414

[56] References Cited

U.S. PATENT DOCUMENTS

| | | |
|---|---|---|
| 4,812,781 | 3/1989 | Regnier ................................. 330/254 |
| 5,144,233 | 9/1992 | Christenson et al. .............. 324/207.25 |
| 5,432,476 | 7/1995 | Tran ..................................... 330/255 |
| 5,450,008 | 9/1995 | Good et al. ............................. 324/166 |
| 5,477,142 | 12/1995 | Good et al. ............................. 324/166 |
| 5,493,214 | 2/1996 | Good et al. ............................. 324/173 |
| 5,510,706 | 4/1996 | Good ..................................... 324/166 |
| 5,554,957 | 9/1996 | Klein ..................................... 330/251 |

*Primary Examiner*—Jay Patidar
*Attorney, Agent, or Firm*—Jimmy L. Funke

[57] ABSTRACT

A variable reluctance sensor interface module having a variable attenuation circuit and a rectifier and differential single-ended conversion circuit for operating in a current mode to attenuate a differential input voltage. The variable attenuation circuit receives an input differential voltage from a magnetic sensor and converts the differential voltage to current. First and second current sourcing circuits, each including a plurality of current sourcing branches, receives the current and provides current attenuation by switching in and out transistor-based current sourcing branches. The rectifier and differential to single-ended conversion circuit converts the variably attenuated currents to a voltage output.

11 Claims, 6 Drawing Sheets

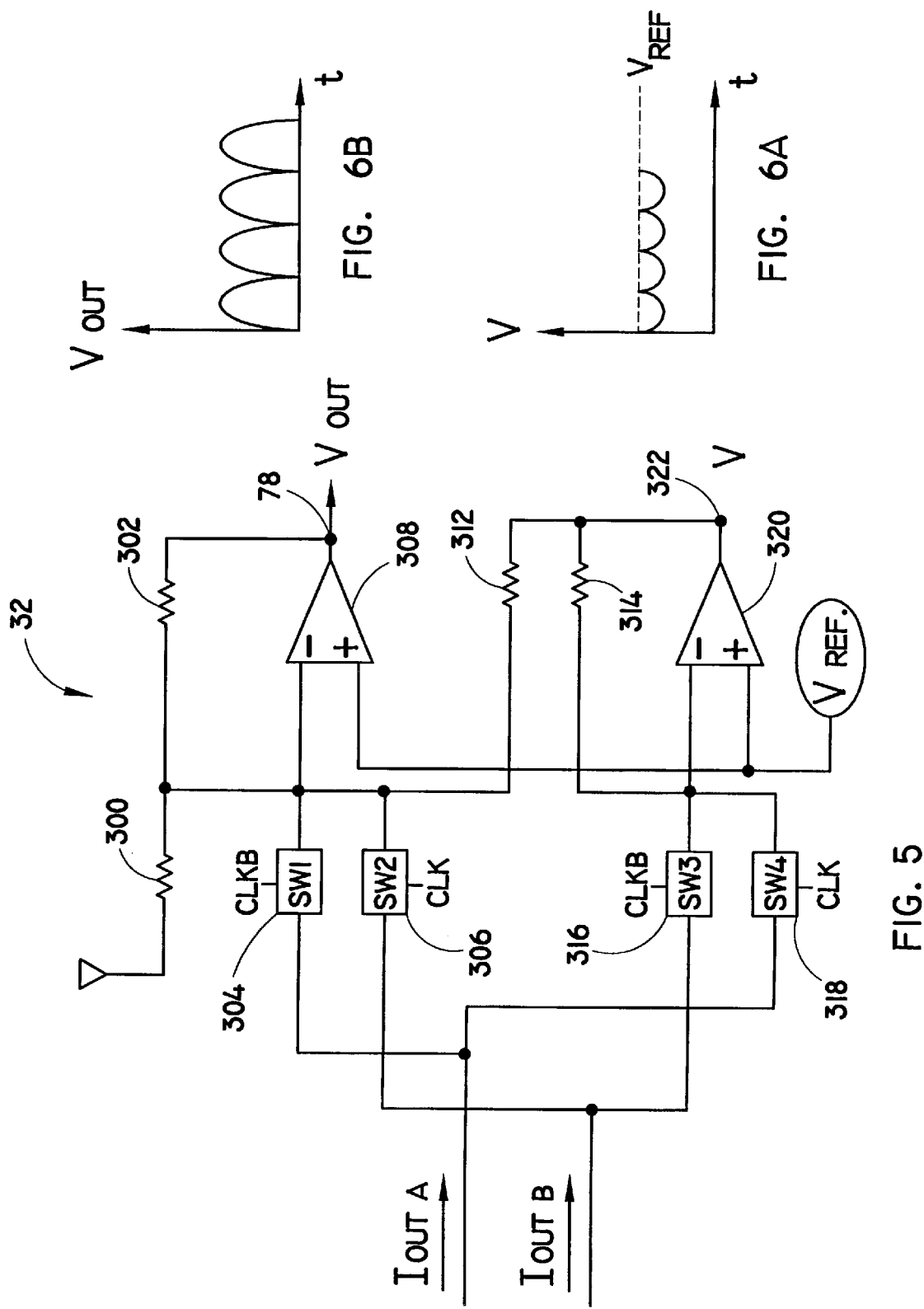

CURRENT MODE DIFFERENTIAL TO SINGLE-ENDED CONVERSION CIRCUIT FOR A MAGNETIC WHEEL SPEED SENSOR

BACKGROUND OF THE INVENTION

The present invention relates generally to an adaptive attenuation and differential to single-ended conversion circuit and, more particularly, to an adaptive attenuation and conversion circuit for adaptively attenuating an alternating differential voltage produced by a magnetic or variable reluctance sensor in response to rotation of a wheel, while maintaining noise immunity.

Inductive magnetic sensors are commonly employed for automotive applications and the like to provide timing signals which enable the determination of position and speed of a rotating wheel. For example, specific applications may include the determination of engine crankshaft position and speed (i.e., RPM) and the determination of wheel speed for anti-lock braking systems. Inductive magnetic sensors generally used for these types of applications are commonly referred to as variable reluctance sensors.

The variable reluctance sensor is generally located adjacent to a rotating wheel which typically has a plurality of circumferentially spaced slots formed therein. The sensor has an inductive magnetic pick-up that is generally made up of a pickup coil wound on a permanent magnetic core. As the wheel rotates relative to the pick-up coil, an alternating voltage is generated in the pick-up coil when the slots on the wheel travel past the sensor. The alternating voltage must then be correctly decoded to recognize high or positive voltage levels. The requency of the alternating voltage is then determined to achieve rotational speed information bout the wheel.

The alternating voltage that is produced with the variable reluctance sensor has peak voltages that generally vary in amplitude according to the rotational speed of the wheel. In a number of automotive applications, the amplitude of the peak voltage may vary from approximately 250 millivolts (mV) at low end speeds to over 250 volts (V) at higher rotating speeds. However, the sensor output is usually fed to a processing module or other control device that is designed to operate within a more limited voltage range. For instance, automotive processing modules are commonly designed with 5 volts CMOS transistors in order to accommodate size and power constraints. For a 5-volt processing module, the input signal may not exceed 5 volts in order to protect the circuitry. Therefore, in order to accommodate a 0–5 Volt range, the sensor output voltage must be properly attenuated when necessary.

In the past, one problem that has remained with some approaches has involved the inability to achieve a limited input voltage without sacrificing noise immunity and accuracy. For example, one approach to limiting the voltage suggests clipping the sensor output voltage at the rails (i.e., ground and 5 volts) and then using the clipped voltage to obtain the frequency information. However, this voltage clipping approach is very susceptible to noise interference, especially at higher speeds where the noise of the signal can approach the 5-volt limit.

Another approach for attenuating the output voltage of a variable reluctance sensor is discussed in U.S. Pat. No. 5,144,233 issued to Christenson et al. entitled "Crankshaft Angular Position Voltage Developing Apparatus Having Adaptive Control and Diode Control." This approach uses a resistive divider network which is controlled by the forward voltage of a diode. The above-referenced approach has the variable reluctance sensor connected in a single-ended configuration with one end of the pick-up coil connected to ground. In addition, the circuit is capable of swinging to the level of the battery. This single-ended approach operates such that when the input voltage becomes high enough in amplitude to forward bias the diode, a resistive path is established to create a resistor divider network that attenuates the input voltage. However, this approach does not teach the attenuation of a differential voltage, and may not provide sufficient attenuation control that is necessary to protect the 5-volt gates associated with the processing module.

Another approach uses an RC network to attenuate the input voltage. While conventional RC filtering approaches have provided suitable attenuation for low voltage attenuation, high voltage attenuation applications such as those associated with Direct Ignition System (DIS) have exhibited limited attenuation capability. That is, it is generally difficult to provide substantial voltage attenuation for high voltages and also more difficult to control the attenuation. In addition, the RC filter introduces the propensity of a phase shift between the inputs for a differential voltage, thereby potentially causing significant errors in zero-crossing position determination.

More recently, one approach that uses variable resistance to attenuate the input voltage is disclosed in U.S. Pat. No. 5,450,008, entitled "Adaptive Loading Circuit for a Differential Input Magnetic Wheel Speed Sensor," issued to Good et al., and also disclosed in U.S. Pat. No. 5,510,706, entitled "Differential to Single-Ended Conversion Circuit for a Magnetic Wheel Speed Sensor," issued to Good. The aforementioned U.S. patents are hereby incorporated by reference. The approach disclosed in U.S. Pat. Nos. 5,450,008 and 5,510,706 discuss an adaptive loading circuit that provides variable attenuation by switching binary weighted resistors between input nodes. Included in this approach are multiple resistors and switch pairs which provide voltage attenuation. This approach differentially attenuates the voltage input and is capable of providing sufficient attenuation on high input amplitudes for a 5-volt interface circuit. However, a minimum of three resistors are required for each of the differential inputs. In addition, the switch that is employed is designed to be large so that impedance of the voltage divider is dominated by the resistor, which makes for a large area. Further, the input resistance must vary from 1 to 64 as the switch area varies from 64 to 1. This range of values can make it difficult to match various attenuation stages and also adds to increased circuit area.

Accordingly, it is one object of the present invention to provide adaptive attenuation of an alternating differential voltage that is produced by a magnetic sensor in response to the rotation of a wheel. It is a further object of the present invention to provide for a variable attenuation circuit and differential to single-ended conversion circuit which are capable of handling a differential voltage that is generated by a variable reluctance sensor with a minimum circuit area, with minimum external circuitry and further with minimal errors and maximum noise immunity.

SUMMARY OF THE INVENTION

In accordance to the teachings of the present invention, a circuit is provided for converting a differential voltage to a single-ended voltage in a current mode. The conversion circuit has an input circuit including first and second input lines for receiving a differential voltage that is produced by a magnetic sensor in response to rotation of a wheel. A variable attenuation circuit is coupled to the first and second input lines to provide variable attenuation, as needed. The variable attenuation circuit converts the differential voltage to a differential current and variably attenuates the differential current as needed. The conversion circuit includes a rectification circuit for converting the attenuated differential current to a single-ended voltage output that provides rotational speed information about the wheel.

These and other features, objects, and benefits of the invention will be recognized by those who practice the invention and by those skilled in the art, from reading the following specification and claims, together with reference to the accompanying drawings.

This application is one of two applications filed on the same date, both commonly assigned and having similar specifications and drawings, the other application being identified as U.S. Ser. No. 09/080/383 now issued as U.S. Pat. No. 6,044,693, titled "Variable Attenuation Circuit for a Differential Variable Reluctance Sensor Using Current Mode," to Manlove, et al.

BRIEF DESCRIPTION OF THE DRAWINGS

In the drawings:

FIG. 5 is a circuit diagram illustrating the current mode rectifier and differential to single-ended conversion circuit of the interface module according to the present invention; and FIGS. 6A and 6B are graphs illustrating voltage provided by the current mode rectifier and differential to the single-ended conversion circuit of FIG. 5.

DETAILED DESCRIPTION OF THE PREFERRED EMBODIMENTS

Figure 1:
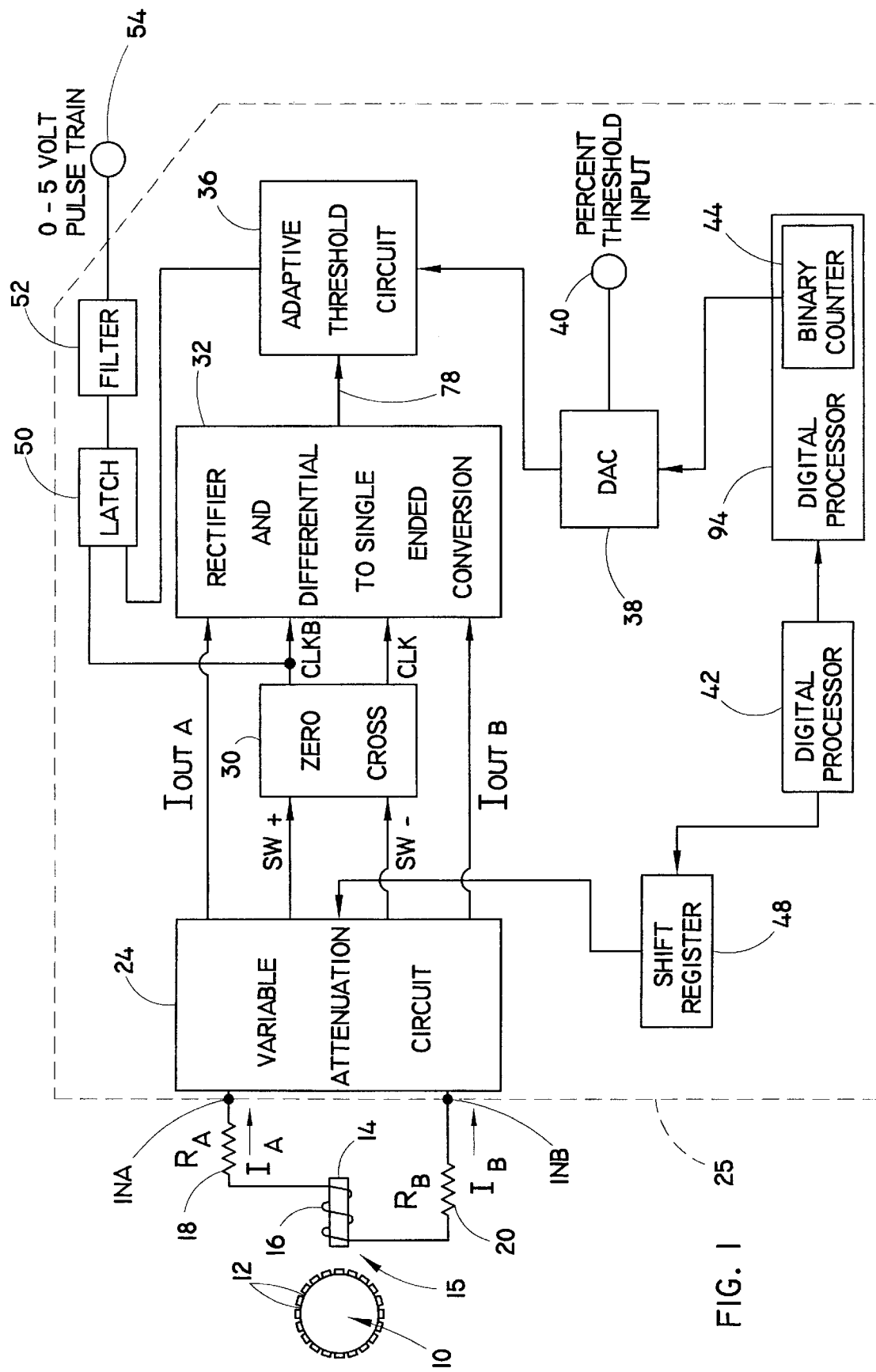
FIG. 1 is a schematic diagram illustrating a variable reluctance sensor interface module for interfacing a variable reluctance sensor with a processing module.
Figure 2:
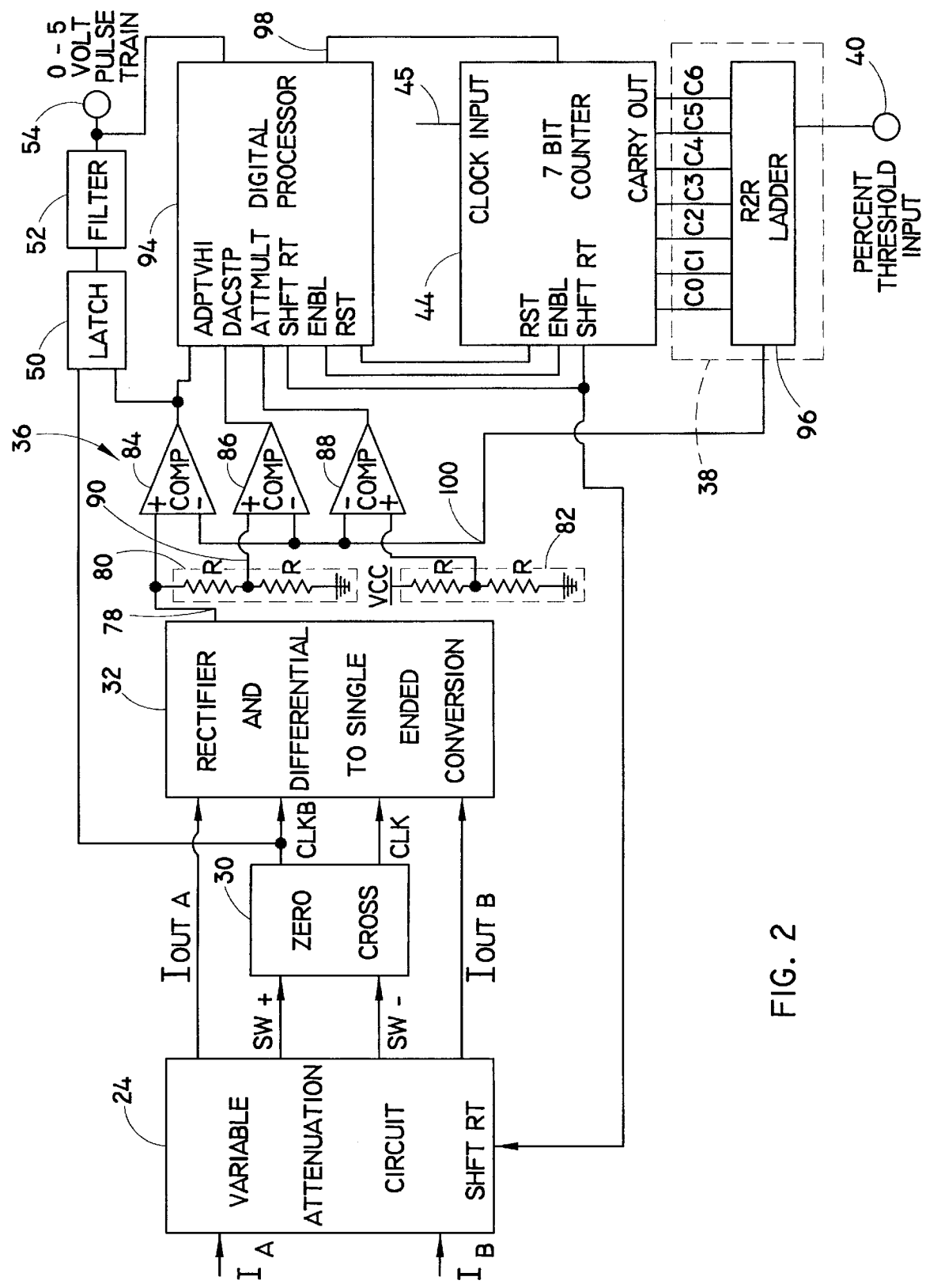
FIG. 2 is a schematic diagram further illustrating the variable reluctance sensor interface module as shown in FIG. 1.

Referring now to FIGS. 1 and 2, a variable reluctance sensor interface module 25 is shown therein for interfacing a variable reluctance sensor 15 with a processing module (not shown). The variable reluctance sensor interface module 25 is adapted to be used in a vehicle (not shown), such as an automobile. More particularly, this invention will be described for use in sensing rotational wheel speed for systems such as anti-lock braking systems. However, it is to be understood that the use of this invention is not restricted to automobiles and anti-lock braking systems, but could have other uses such as determining engine crankshaft position and speed for a distributorless ignition system (DIS).

With particular reference to FIG. 1, a rotatable wheel 10 is shown which may be driven in conjunction with a wheel/tire assembly found on a vehicle, such as an automobile. The wheel 10 has a plurality of slots 12 that are preferably evenly spaced from each other about the outer periphery of the wheel 10. In a distributorless ignition system (DIS) application for a spark ignited internal combustion engine, an additional slot may be employed for purposes of synchronizing the distributorless ignition system in a manner known to those skilled in the art.

A variable reluctance magnetic pick-up or magnetic sensor 15 is disposed adjacent to the outer periphery of wheel 10. The magnetic sensor 15 includes a magnetic pick-up made up of a permanent magnet 14 which has a core formed of magnetic material and a pick-up coil 16 that is wound on the permanent magnet 14. The magnetic sensor 15 has a fist sensor output line 18 connected to one side of pick-up coil 16 and a second sensor output line 20 connected to the other side of pick-up coil 16.

As the plurality of slots 12 on wheel 10 rotate past the end of magnetic sensor 15, an alternating differential voltage is induced or generated on the pick-up coil 16. The differential voltage waveform generated on pick-up coil 16 is transmitted onto first and second sensor output lines 18 and 20 as a series of two alternating voltages which are one hundred eighty degrees (180°) out of phase relative to one another. Each cycle of the alternating voltage represents the passage of one of slots 12 past the end of the magnetic sensor 15. Accordingly, each voltage cycle occurs at predetermined angularly spaced positions as found on wheel 10. In effect, the peak-to-peak voltage potential existing between sensor output lines 18 and 20 represents the amplitude of peak-to-peak voltage created by the changing or varying reluctance of the magnetic field produced by magnetic sensor 15.

Connected in series with first sensor output line 18 is a series load resistor $R_A$. Likewise, connected in series to second sensor output line 20 is a second load resistor $R_B$. The pair of series load resistors $R_A$ and $R_B$ each have a predetermined resistance of approximately one hundred Kilohms (100 KΩ), according to one example, and provide a known series resistive load to the sensor output lines 18 and 20. The differential voltage produced by the variable reluctance sensor 15 generates positive current $I_A$ across resistor $R_A$ and negative current $I_B$ across resistor $R_B$.

The variable reluctance sensor interface module 25 has a pair of input pads INA and INB connected to first and second sensor output lines 18 and 20 and associated series load resistors $R_A$ and $R_B$, respectively, for receiving the differential input voltage. The interface module 25 receives the differential input voltage and currents $I_A$ and $I_B$ at input pads (e.g., terminals) $IN_A$ and $IN_B$. The interface module 25 in turn processes the received differential voltage and currents $I_A$ and $I_B$ and produces a 0–5 volt digital pulse train at output 54 for use by a processing module to achieve rotational speed information about the wheel 10.

Generally speaking, the interface module 25 includes a variable attenuation circuit 24, a zero crossing detector 30, a rectifier and differential to single-ended conversion circuit 32, an adaptive threshold circuit 36, and an associated digital-to-analog convertor (DAC) 38. The variable attenuation circuit 24 receives currents $I_A$ and $I_B$ from lines 18 and 20, respectively, and provides signal attenuation in a current mode. Variable attenuation circuit 24 provides attenuated current outputs $I_{OUT\ A}$ and $I_{OUT\ B}$ to the rectifier and differential to single-ended conversion circuit 32 as well as signals SW+ and SW− to a zero crossing detector 30. The signals SW+ and SW− provide polarity information about the input. The zero crossing detector 30 in turn indicates whether the input is currently positive or negative. The rectifier and differential to single-ended conversion circuit 32 rectifies the differential input and provides a single-ended voltage output on line 78, which is input to the adaptive threshold circuit 36.

With particular reference to FIG. 2, the adaptive threshold circuit 36 includes first, second, and third voltage comparators 84, 86, and 88. The first voltage comparator 84 has a positive (+) input connected to the output of the conversion circuit 32 for receiving the single-ended voltage output 78. In addition, voltage comparator 84 has the negative (−) input connected to an analog output of the DAC 38 for receiving an analog threshold voltage. The second comparator 86 has a positive (+) input connected to the output of conversion circuit 32 via a resistor divider network 80 which has a plurality of resistors R coupled to a programmable control multiplexer (not shown). Resistor divider network 80 divides the single-ended voltage into a selected percent thereof which may be chosen by a user and loaded into the control multiplexer. The negative (−) input of voltage comparator 86 is also connected to the analog output of the DAC 38. The third voltage comparator 88 has a positive (+) input connected to voltage supply VCC via a resistor divider network 82. The negative (−) input of voltage comparator 88 is likewise connected to the analog output of the DAC 38.

Voltage comparators 84, 86, and 88 each have an output that is connected to the inputs of the second digital processor 94. More specifically, the output of comparator 84 is fed to an ADPTVHI input of processor 94 and is also fed to one input of a latch 50. The output of comparator 86 is fed to a DACSTP input of processor 94, while the output of comparator 88 is input to an ATTMULT input of processor 94. Digital processor 94 has a shift right (SHFT RT) output connected to a SHFT RT input of a 7-bit binary pulse counter 44 as well as the SHFT RT input to variable attenuation circuit 24. Digital processor 94 further includes enable (ENBL) and reset (RST) outputs connected to corresponding ENBL and RST inputs of counter 44 for controlling operation of binary counter 44.

The 7-bit binary pulse counter 44 performs a successive binary counting operation in response to signals provided to the enable (ENBL) and reset (RST) inputs thereof. In doing so, pulse counter 44 further has a clock input 45 that is connected to a source of constant frequency pulses which control the count rate. Counter 44 also includes seven output lines connected to DAC 38 for supplying the DAC 38 with seven count bits C0 through C6 which contain the count magnitude. In addition, DAC 38 receives a preset threshold input via line 40 for enabling a user to select the percent threshold with which to compare the single-ended voltage 78 via comparators 84, 86, and 88.

The reset latch 50 has one input connected to the output of the first voltage comparator 84 and a second input connected to the output of the zero crossing voltage comparator 30 at line CLKB. Latch 50 detects positive or rising voltage swings generated by voltage comparator 84, and generates a rising voltage pulse 55 in response thereto. Latch 50 further detects voltage crossings between the differential voltage across input pads INA and INB as detected by zero crossing detector 30 and produces falling edges in response thereto. Latch 50 also has an output coupled to a filter 52 which provides a filter delay time in order to filter out unwanted noise. Accordingly, an output 54 is provided via filter 52 which is in the form of digital 0–5 volt pulse train.

It should be appreciated that the adaptive threshold circuit 36 and associated digital-to-analog convertor 38 as well as latch 50, filter 52, shift register 48, and digital signal processors 42 and 94 provide substantially the same operation as is disclosed in issued U.S. Pat. Nos. 5,450,008 and 5,510,706, which are incorporated herein by reference. The current mode variable attenuation circuit 24 as well as the rectifier and differential to single-ended conversion circuit 32 and associated hardware and processing techniques are discussed in detail as follows.

Variable Attenuation Circuit

The variable attenuation circuit 24 provides adaptive attenuation of an alternating differential voltage that is produced by a magnetic sensor in response to rotation of a wheel by detecting and processing the signal in a current mode according to the present invention. By detecting and processing the input signal as a current signal rather than a voltage, a more optimal solution may be realized. The current mode also allows for a reduction in the external circuitry that would otherwise be required, with minimal errors, while realizing maximum noise immunity.

Figure 3:
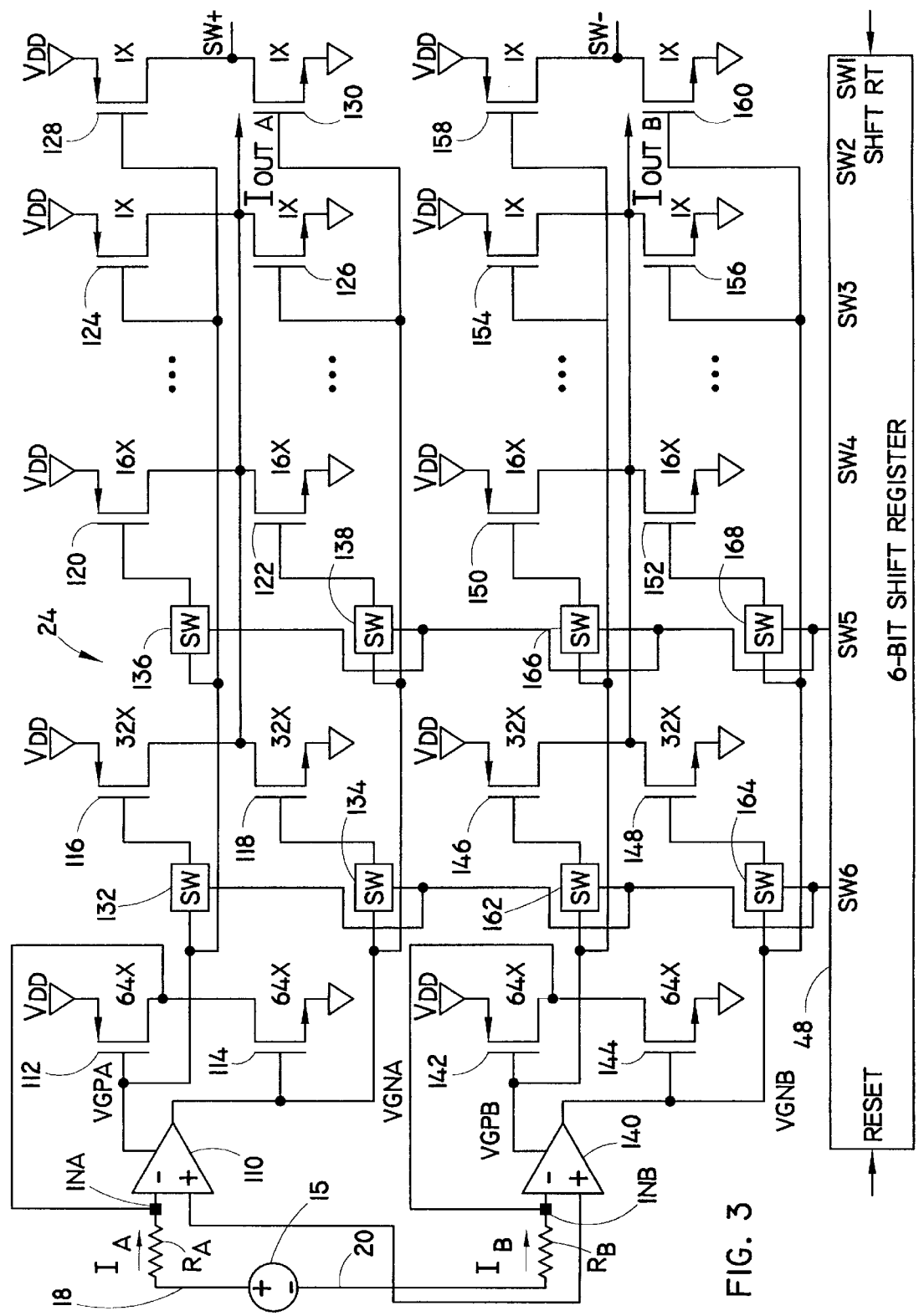
FIG. 3 is a circuit diagram illustrating the current mode variable attenuation circuit of the interface module according to the present invention.

Referring to FIG. 3, the variable attenuation circuit 24 is shown conceptually for use for a differential input magnetic wheel speed sensor 15 by processing input currents $I_A$ and $I_B$ using a current mode and producing output current signals $I_{OUT\,A}$ and $I_{OUT\,B}$. The variable reluctance sensor 15 output is depicted as a differential voltage source. This voltage source is converted to positive and negative currents $I_A$ and $I_B$, externally through resistors $R_A$ and $R_B$, respectively. The variable attenuation circuit 24 includes a first current sourcing circuit coupled to input pad INA for sourcing current to maintain a fixed voltage at input pad INA. The variable attenuation circuit 24 also includes a second current sourcing circuit coupled to input pad INB for sourcing current to maintain a fixed voltage at the input pad INB. Each of the first and second current sourcing circuits includes an amplifier and a plurality of current sourcing branches, which are selectively switched in and out with switching circuitry to provide selectable amounts of current branching as needed to maintain a differential output current that realizes an output voltage on line 54 within a workable range. According to the embodiment shown, each of the plurality of current sourcing branches are binary weighted, however, it should be appreciated that other weighting variations may be employed.

The first current sourcing circuit has a first amplifier 110 configured as a differential stage amplifier, while the second current sourcing circuit has a second amplifier 140 configured as a differential stage amplifier. The first amplifier 110 has a negative (−) input coupled to positive input pad INA for receiving positive input current $I_A$. The positive (+) input of amplifier 110 is coupled to the positive (+) input of the second amplifier 140 and is referenced to mid supply ($V_{DD}/2$), which is approximately 2.5 volts according to one example. The first amplifier 110 produces two output voltages identified as voltages VGPA and VGNA. Voltage VPGA is a voltage applied to the gate of a 64X P-channel transistor 112 which has its source coupled to rail voltage $V_{DD}$. Voltage VGNA is a gate voltage applied to the gate of a 64X N-channel transistor 114 which has its source coupled to ground. The drain terminals of transistor 112 and transistor 114 are tied together and further coupled to input pad INA. Together, transistors 112 and 114 make up the output stage of amplifier 110. Input pad INA is maintained at 2.5 volts through negative feedback of the first amplifier 110 and the 64X P-channel and N-channel transistors 112 and 114, respectively.

The output current sourced by the 64X transistors 112 and 114 is equal to the input current $I_A$ to compensate for the external input current $I_A$ provided by the sensor 15 and external resistor $R_A$. Voltages VGPA and VGNA are established with amplifier 110, through feedback, to provide the desired output current. The two gate voltages VGPA and VGNA are either connected to the gates of the various selected pairs of current sourcing transistors or the respective P-channel transistor gates are connected to rail voltage $V_{DD}$ and the N-channel transistor gates are grounded. At all times, it is preferred that a 1X transistor pair is always connected.

The first current sourcing circuit further includes a plurality of pairs of P-channel and N-channel transistors connected as current sourcing branches which may be switched in or out to add to the final output current $I_{OUT\,A}$. The pairs of P-channel and N-channel transistor current sourcing branches are preferably binary weighted to sequentially add to or reduce the total current $I_{OUT\,A}$ as a multiplication factor of two. Included are 32X, 16X, 8X, 4X, 2X, and 1X current sourcing branches. The 32X current sourcing branch has a 32X P-channel transistor 116 with its source tied to rail voltage $V_{DD}$, and a 32X N-channel transistor 118 with its source tied to ground. The drain terminals of transistor 116 and transistor 118 are tied together and further coupled to the output for providing a current contribution to output current $I_{OUT\,A}$. The 32X transistor pair made up of transistors 116 and 118 is controlled by switching circuitry including switches 132 and 134, respectively, which apply gate voltage VGPA to the gate of transistor 116 and gate voltage VGNA to the gate of transistor 118 when switch control signal SW6 is activated.

The first current sourcing circuit likewise includes a 16X current sourcing branch made up of a 16X P-channel transistor 120 with its source coupled to rail voltage $V_{DD}$ and a 16X N-channel transistor 122 having its source tied to ground. The drain terminals of transistor 120 and transistor 122 are tied together and further coupled to the output for providing a current contribution to output current $I_{OUT\,A}$. Switches 136 and 138 are responsive to switch control signal SW5 to control the application of gate voltage VGPA to the gate of transistor 120 and gate voltage VGNA to the gate of transistor 122 so as to activate or deactivate the corresponding 16X current sourcing branch. In addition, the first current sourcing circuit includes current sourcing branches made up of pairs of P-channel and N-channel transistors having a size of 8X, 4X, and 2X transistors, each of which are switched in by respective switch control signals SW4, SW3, and SW2. Further shown is a 1X current sourcing branch made up of a 1X P-channel transistor 124 having the source tied to rail voltage $V_{DD}$ and a 1X N-channel transistor 126 having the source tied to ground. The 1X current sourcing branch is always activated and therefore always provides a current contribution to output current $I_{OUT\,A}$.

Further, the first current sourcing circuit includes a second pair of 1X transistors, including 1X P-channel transistor 128 having the source tied to rail voltage $V_{DD}$ and a 1X N-channel transistor 130 having the source tied to ground. The drain terminals of transistor 128 and transistor 130 are tied together to provide the input polarity signal SW+. Signal SW+ provides polarity information about the input signal. Signal SW+ is positive when input current $I_A$ is positive.

The second current sourcing circuit processes the negative current signal $I_B$ and is configured similar to the first current sourcing circuit described above. Included is the second amplifier 140 which has a negative (−) input coupled to input pad INA for receiving input current $I_B$. The positive (+) input of amplifier 140 is coupled to the positive input of the first amplifier 110 and referenced to mid supply ($V_{DD}/2$) which is approximately 2.5 volts. The second amplifier 140 produces two output voltages identified as voltages VGPB and VGNB. Voltage VGPB is a voltage applied to the gate of a 64X P-channel transistor 142 which has its source coupled to rail voltage $V_{DD}$. The voltage VGNB is a voltage applied to the gate of a 64X N-channel transistor 144, which has its source coupled to ground. The drain terminals of transistor 142 and transistor 144 are tied together and further coupled to input pad INB. Together, transistors 142 and 144 make up the output stage of amplifier 140. Input pad INB is maintained at 2.5 volts through negative feedback of the amplifier 140 and the 64X P-channel and N-channel transistors 142 and 144, respectively.

The output current sourced by the 64X transistors 142 and 144 is equal to the input current $I_B$ to compensate for the external input current $I_B$ provided by the sensor 15 and external resistor $R_B$. Voltages VGPB and VGNB are established with amplifier 140, through feedback, to provide the desired output current. The two gate voltages VGPB and VGNB are either connected to the gates of the various selected pairs of current sourcing transistors or the respective P-channel transistor gates are connected to rail voltage $V_{DD}$ and the N-channel transistor gates are grounded. At all times, it is preferred that a 1X transistor pair is always connected.

The second current sourcing circuit further includes a plurality of pairs of P-channel and N-channel transistors connected as current sourcing branches which may be switched in or out to add to the final output current $I_{OUT\,B}$. The pairs of P-channel and N-channel transistor current sourcing branches are preferably binary weighted to sequentially add to or reduce the current as a multiplication factor of two. Included are 32X, 16X, 8X, 4X, 2X, and 1X current sourcing branches. The current 32X sourcing branch has a 32X P-channel transistor 146 with the source tied to rail voltage $V_{DD}$ and a 32X N-channel transistor 148 with the source tied to ground. The drain terminals of transistor 146 and transistor 148 are tied together and further coupled to the output for providing a current contribution to current $I_{OUT\,B}$. The transistor pair made up of transistors 146 and 148 are controlled by switching circuitry including switches 162 and 164 which apply gate voltage VGPB to the gate of transistor 146 and gate voltage VGNA to the gate of transistor 148 when switch control signal SW6 is activated.

The second current sourcing circuit likewise includes a 16X current sourcing branch made up of 16X P-channel transistor 150 with the source coupled to rail voltage $V_{DD}$ and 16X N-channel transistor 152 having the source tied to ground. The drain terminals of transistor 150 and transistor 152 are tied together and further coupled to the output for providing a current contribution to output current $I_{OUT\,B}$. Switches 166 and 168 are responsive to switch control signal SW5 to control the application of gate voltage VGPB to the gate of transistor 150 and gate voltage VGNB to the gate of transistor 152 so as to activate or deactivate the corresponding 16X current sourcing branch. In addition, the second current sourcing circuit further includes current sourcing branches made up of pairs of P-channel and N-channel transistors having a size of 8X, 4X, and 2X transistors, each of which are switched in by respective switch control signals SW4, SW3, and SW2. Further shown is a 1X current sourcing branch made up of a 1X P-channel transistor 154 having the source tied to rail voltage $V_{DD}$ and a 1X N-channel transistor 156 having the source tied to ground. The 1X current sourcing branch is always activated and therefore always provides a current contribution for output current $I_{OUT\,B}$. Further, the second current sourcing circuit includes a second pair of 1X transistors, including 1X P-channel transistor 158 having the source tied to rail voltage $V_{DD}$ and 1X N-channel transistor 160 having the source tied to ground. The drain terminals of transistor 158 and transistor 160 are tied together to provide the input polarity signal SW−. Input polarity signal SW− provides polarity information about the input signal. Signal SW− is negative when output current $I_B$ is negative.

As the positive and negative current signals $I_A$ and $I_B$ are processed identically, the description hereinafter will detail the circuitry on the positive side. The output current from the 64X pair of transistors 112 and 114 is equal to the input current $I_A$ to compensate for the external input current $I_A$ provided by the sensor 15 and external resistor $R_A$. The current sourcing branches include 32X, 16X, 8X, 4X, 2X, and 1X current sourcing branches, which together provide a sum total of 64X size transistors which equals the 64X size transistors 112 and 114 at the output stage of amplifier 110 to provide a one-to-one ratio when all transistors are activated. A one-to-one ratio provides no current attenuation such that the output current $I_{OUT\ A}$ is equal to the input current A. To attenuate the input current $I_A$, one or more current sourcing branches are switched out (e.g., deactivated) so as to decrease the transistor ratio of current sourcing branch transistors to the 64X output stage transistors. By switching out the 32X current sourcing branch made up of the pair of transistors 116 and 118, a transistor ratio of 32:64 (e.g., ½) is achieved so as to provide current attenuation by a factor of two to thereby reduce the input current $I_A$ by one-half. Similarly, to achieve further attenuation, the 16X current sourcing branch made up of transistors 120 and 122 is switched out to provide a transistor ratio of 16:64 (e.g., ¼) to achieve a current attenuation factor of four to thereby reduce the input current $I_A$ by one-fourth. Current attenuation likewise continues by deactivating the current sourcing branches made up of the 8X, 4X, and the 2X transistors in sequence so that the 1X current sourcing branch made up of transistors 124 and 126 remains on to provide a ratio of 1:64 and therefore a current attenuation of one-sixty fourth (1/64).

Initially, it is assumed that the input signals are relatively small. Under this condition, the transistor gates are connected to gate voltages VGPA and VGNA. The 32X transistor pair has an output current equal to one-half the input current $I_A$. The 16X transistor pair has an output current equal to one-quarter the input current A. The remaining four transistor pairs are each one-half the previous value, such that all the output currents when summed are equal to (½+¼+⅛+1/16+1/32+1/64+1/64)×$I_A$ at the output terminal $I_{OUT\ A}$. This generates an output current $I_{OUT\ A}$ equal to the input current $I_A$. The output current $I_{OUT\ A}$ is converted to a voltage as will be described later hereinafter.

To attenuate the output current $I_{OUT\ A}$ by a factor of two, the 32X transistor pair is switched off. This is accomplished by tying the gate of the P-channel transistor 116 to rail voltage $V_{DD}$ and the gate of N-channel transistor 118 to ground. The current output is now equal to one-half the original value. Attenuation by an additional factor of two may be achieved by next switching the 16X pair of transistors 120 and 122 off, so that the output current $I_{OUT\ A}$ is attenuated by an additional factor of two. Successive pairs of transistors may be switched off by a factor of two in sequence. With all six controllable current sourcing branches switched off, an ultimate attenuation of 1/64 is achieved. Attenuation control is applied to the positive and negative terminals in the same manner assuring the differential input is attenuated correctly.

In order to provide for a 0- to 5-volt output range, it is generally preferred that the current attenuation occur at a selected percent, such as about eighty percent (80%) of full scale. This may be accomplished by monitoring the output voltage 78 to maintain the output voltage within a 0- to 4-volt range. Accordingly, when the peak-to-peak voltage at output 78 remains within zero to four volts peak-to-peak, no current attenuation occurs. However, when the output voltage 78 exceeds four volts, shift register 48 initiates a shift-right to cause switch output SW6 to activate switches 132 and 134 as well as switches 162 and 164 to switch out the corresponding transistors 116, 118, 146, and 148 and remove the 32X current sourcing branch. This, in effect, reduces the output current $I_{OUT\ A}$ and $I_{OUT\ B}$ and, therefore, the output voltage $V_{OUT}$, by one-half.

Figure 4A:
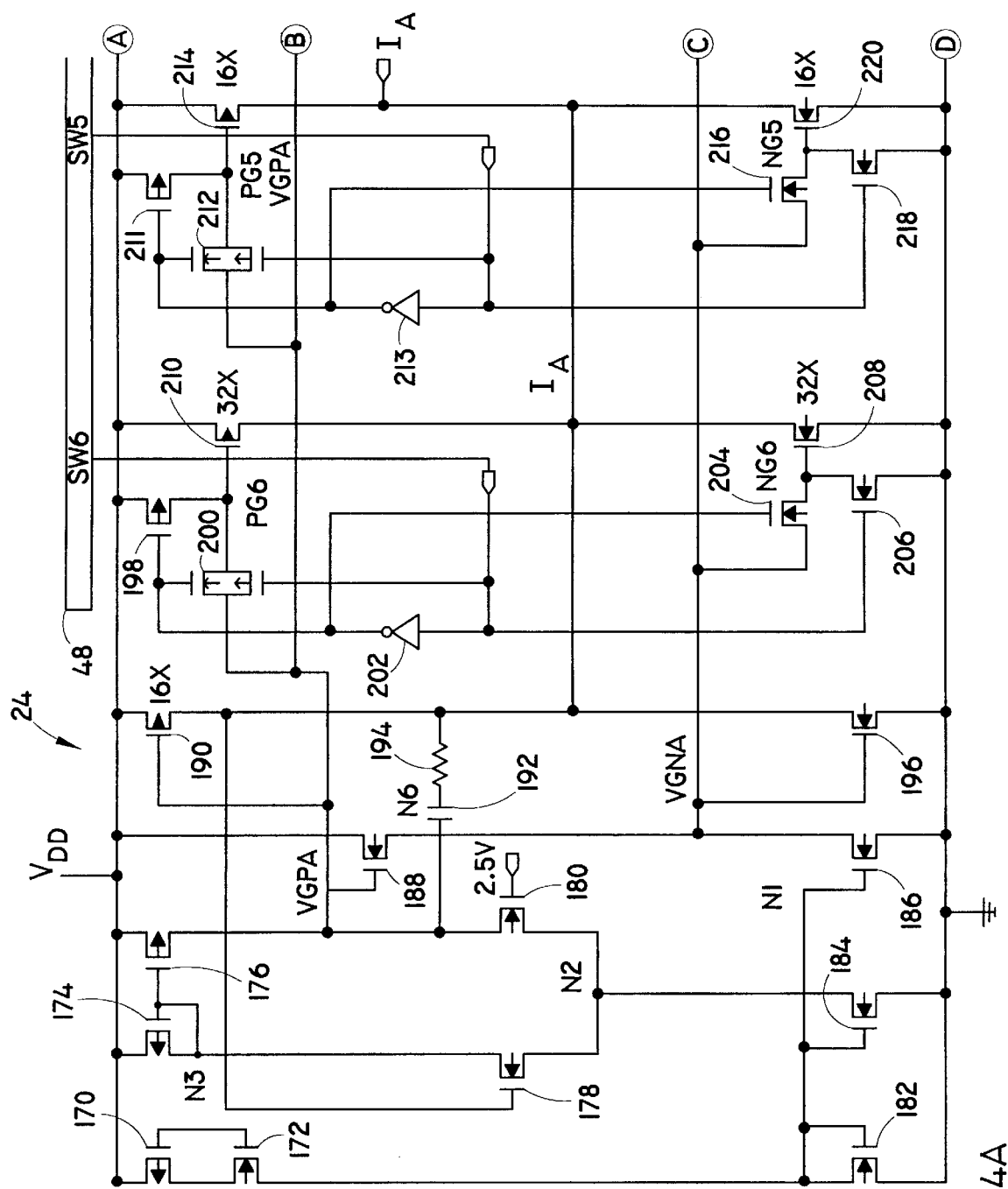
FIGS. 4A and 4B together are a circuit diagram further illustrating the variable attenuation circuit of FIG. 3.
Figure 4B:
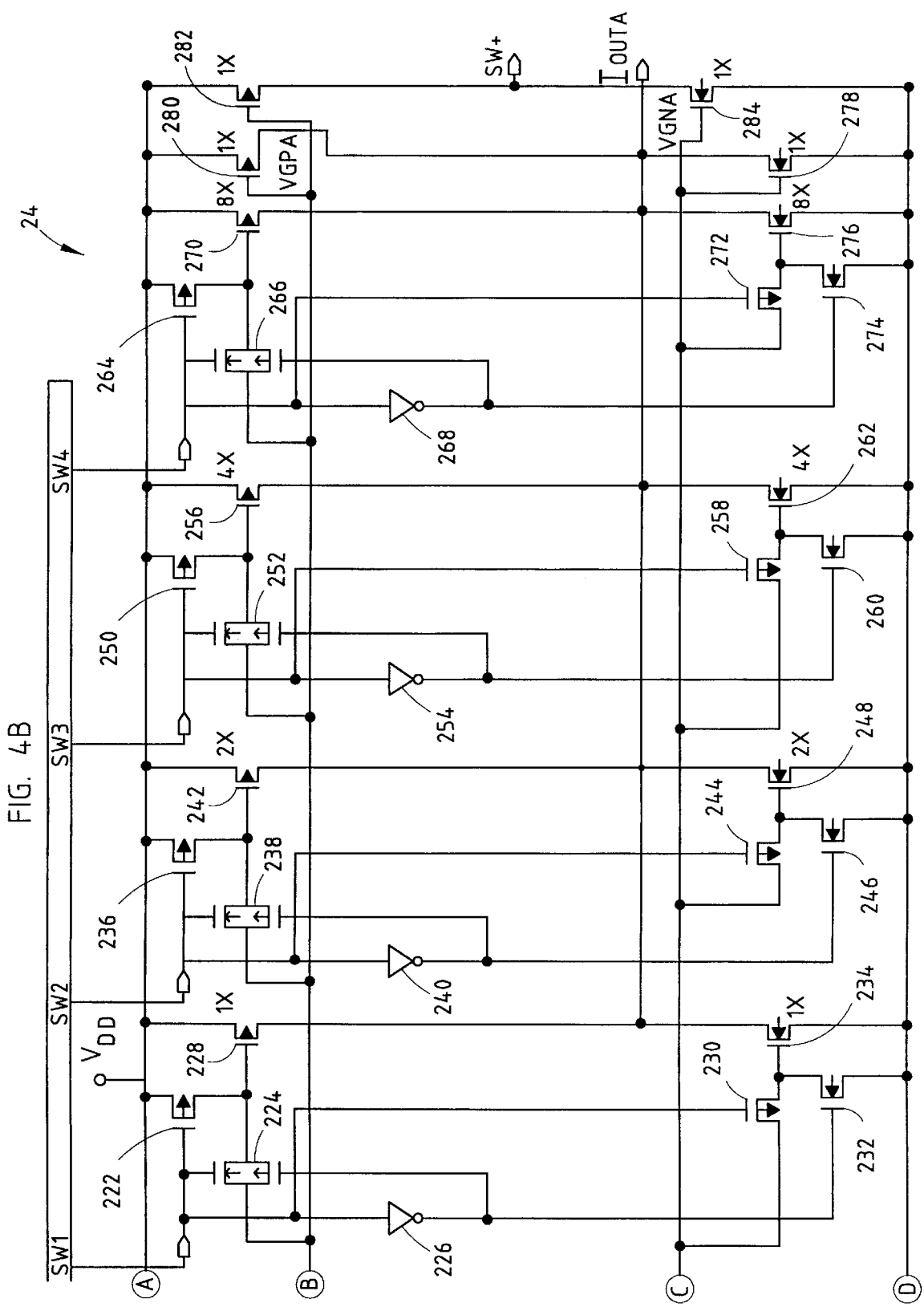

Referring particularly to FIGS. 4A and 4B, the positive side of the variable attenuation circuit 24 is shown as implemented according to another circuit arrangement. Variable attenuation circuit 24 includes P-channel transistors 170, 174, and 176; N-channel transistors 172, 178, 180, 182, 184, 186, and 188; capacitor 192; and resistor 194, which together make lo up the differential stage of amplifier 110. P-channel transistors 170, 174, and 176 each have the source coupled to rail voltage $V_{DD}$, with transistors 174 and 176 having the gate terminals connected together and to node N3. Transistors 178 and 180, which provide a differential stage, each have a source tied to node N2 which, in turn, is tied to the drain of transistor 184. The drain of transistor 178 is coupled to node N3, while the gate thereof is tied to input pad INA to receive input current $I_A$. The gate of transistor 180 receives a 2.5-volt input, while the drain provides the gate voltage VGPA. Transistor 172 has its gate coupled to the gate of transistor 170 and a drain tied to the drain of transistor 170. The source of transistor 172 is coupled to node N1, which is further tied to both the drain and gate of transistor 182 as well as the gates of transistors 184 and 186. The source of transistors 182, 184, and 186 are all tied to ground. In addition, transistor 188 has the gate tied to gate voltage VGPA, the drain tied to rail voltage $V_{DD}$, and the source coupled to the gate voltage VGNA. Further, the drain of transistor 186 is coupled to gate voltage VGNA. Capacitor 192 and resistor 194 provide feedback stability.

The current sourcing branch, as shown in FIGS. 4A and 4B, is shown implemented different from that of FIG. 3, in that the output stage of amplifier 110, which included 64X transistors 112 and 114 in FIG. 3, is shown in FIG. 4A made up of a 16X pair of transistors 190 and 196, a 32X pair of transistors 210 and 208, and another 16X pair of transistors 214 and 220. Together, the 16X, 32X, and 16X pair of aforementioned transistors can sum together for a size total of 64X, or can be employed in various combinations so as to achieve a desired current sourcing to amplifier transistor ratio and therefore the proper attenuation of input current $I_A$.

More particularly, the first 16X pair of transistors includes P-channel transistor 190 which has the source coupled to rail voltage $V_{DD}$ and a gate coupled to gate voltage VGPA, and an N-channel transistor 196 having the source coupled to ground and the gate coupled to gate voltage VGNA. The drain terminals of transistors 190 and 196 are commonly tied together and to input pad INA to provided feedback to input current $I_A$.

The 32X pair of transistors is made up of P-channel transistor 210 having the source tied to rail voltage $V_{DD}$ and the gate coupled to switch 200 and transistor 198, and an N-channel transistor 208 having the source tied to ground and the gate controllably coupled to gate voltage VGNA via switch-configured transistors 204 and 206. The drain terminals of transistors 210 and 208 are tied together and to the input pad INA to provide feedback to input current $I_A$. Switch 200 in combination with P-channel transistor 198 controls the application of the gate voltage VGPA to the gate of transistor 210. Similarly, transistors 204 and 206 control the application of gate voltage VGNA to the gate of transistor 208. In effect, gate voltages VGPA and VGNA are applied in response to an activated switch control signal SW6. Also included is an invertor 202 for inverting the switch control signal SW6 as applied to switch 200 and transistor 198.

The second 16X pair of transistors includes P-channel transistor 214 having the source coupled to rail voltage $V_{DD}$ and the gate coupled to switch 212 and transistor 211 for controllably receiving gate voltage VGPA, and an N-channel transistor 220 having the source coupled to ground and the gate coupled to transistors 216 and 218 for controllably receiving gate voltage VGNA. The drain terminals of transistors 214 and 220 are tied together and further connected to input pad INA for providing feedback to input current $I_A$. Transistor 211 and switch 212 control application of gate voltage VGPA to the gate of transistor 214 via invertor 213 from switch control signal SW5. Similarly, transistors 216 and 218 control application of gate voltage VGNA to the gate of transistor 220 in response to switch control signal SW5.

With particular reference to FIG. 4B, the current sourcing branches include selectable 1X, 2X, 4X, 8X current sourcing branches, and a fixed 1X current sourcing branch, of which the activated transistors are summed to provide a current sourcing portion of the transistor ratio. The selectable 1X current sourcing branch includes 1X P-channel transistor 228 with the source tied to rail voltage $V_{DD}$ and its gate connected to switch 224 and transistor 222 for controllably receiving gate voltage VGPA. The 1X current sourcing branch also includes a 1X N-channel transistor 234 having the source tied to ground and the gate coupled to transistors 230 and 232 for controllably receiving gate voltage VGNA. When an active signal is applied to switch control signal SW1, switch 224 and transistor 222 allow gate voltage VGPA to be applied to the gate of the transistor 228. The switch control signal SW1 is inverted by way of invertor 226 and applied to transistors 230 and 232 to allow gate voltage VGNA to be applied to the gate of transistor 234.

The 2X current sourcing branch is made up of 2X P-channel transistor 242 having the source tied to rail voltage $V_{DD}$ and the gate coupled to switch 238 and transistor 236 for controllably receiving gate voltage VGPA. The 2X current sourcing branch also includes 2X N-channel transistor 248 having its source tied to ground and the gate coupled to transistors 244 and 246 for controllably receiving gate voltage VGNA. With a high signal applied to switch control signal SW2, switch 238 and transistor 236 allow gate voltage VGPA to be applied to the gate of transistor 242. Similarly, invertor 240 inverts switch control signal SW2, and transistors 244 and 246 allow the gate voltage VGNA to be applied to the gate of transistor 248. This allows the 2X current sourcing branch to provide a current contribution to output current $I_{OUT\,A}$.

The 4X current sourcing branch is made up of 4X P-channel transistor 256 having the source coupled to rail voltage $V_{DD}$ and the gate coupled to switch 252 and transistor 250 for controllably receiving gate voltage VGPA. The 4X current sourcing branch further includes 4X N-channel transistor 262 having the source coupled to ground and the gate coupled to transistors 258 and 260 for controllably receiving gate voltage VGNA. A high signal applied to switch control signal SW3 allows switch 252 and transistor 250 to apply gate voltage VGPA to the gate of transistor 256. Similarly, invertor 254 inverts the switch control signal SW3 and allows transistors 258 and 260 to apply gate voltage VGNA to the gate of transistor 262. This allows the 4X current sourcing branch to provide a current contribution to the output current $I_{OUT\,A}$.

The 8X current sourcing branch has an 8X P-channel transistor 270 with the source tied to rail voltage $V_{DD}$ and the gate connected to switch 266 and transistor 264 for controllably receiving gate voltage VGPA. The 8X current sourcing branch likewise includes an 8X N-channel transistor 276 having the source tied to ground and the gate coupled to transistors 272 and 274 for controllably receiving gate voltage VGNA. With a high signal applied to switch control signal SW4, transistor 264 and switch 266 allow gate voltage VGPA to be applied to the gate of transistor 270. Invertor 268 inverts the switch control signal SW4 and allows transistors 272 and 274 to apply the gate voltage VGNA to the gate of transistor 276. This allows the 8X current sourcing branch to provide a current contribution to output current $I_{OUT\,A}$.

The fixed 1X current sourcing branch made up of P-channel and N-channel transistors 280 and 278, respectively, is always activated to ensure there is always current sourcing provided by the current sourcing branches. The 1X P-channel transistor 280 has its source coupled to rail voltage $V_{DD}$ and its gate tied to gate voltage VGPA. The 1X N-channel transistor 278 has its source tied to ground and its gate tied to gate voltage VGNA. The drain terminals of transistors 278 and 280 are tied together and further coupled to the output line to provide a current contribution to output current $I_{OUT\,A}$.

An additional pair of 1X transistors made up of 1X P-channel transistor 282 and 1X N-channel transistor 284 provide the polarity signal SW+ output.

Accordingly, the positive side of variable attenuator circuit 24 provides variable current attenuation to attenuate the positive input current $I_A$ and provide an attenuated output current $I_{OUT\,A}$. It should be realized that the negative side of variable attenuation circuit 24 is substantially similar to the positive side shown in FIGS. 4A and 4B, and provides variable current attenuation of the negative input current $I_B$ as the output current $I_{OUT\,B}$. The variable current attenuation is realized to provide a differential current, which when converted to single-ended voltage $V_{OUT}$, is within a workable signal range.

The current attenuation realized in the present invention is equal to the output current $I_{OUT\,A}$ divided by the input current $I_A$ which is determined in response to the ratio of the summation of the transistor pairs that are switched on in FIG. 4B divided by the summation of the transistor pairs that are switched on in FIG. 4A. The current attenuation ratio can be represented by the following equation:

$$\frac{I_{OUTA}}{I_A} = \frac{B_0 \cdot 8X + B_1 \cdot 4X + B_2 \cdot 2X + B_3 \cdot 1X + 1X}{A_0 \cdot 32X + A_1 \cdot 16X + 16X}$$

Wherein $B_0$–$B_3$ represent high signals on respective switch control lines SW4–SW1 to switch in the corresponding 8X, 4X, 2X, and 1X pairs of transistors. Binary signals $A_0$ and $A_1$ represent the respective binary switch control signals SW6 and SW5 for controlling the 32X and 16X pairs of transistors shown in FIG. 4A. To achieve full attenuation, binary signals $B_0$–$B_3$ are set equal to 0 and binary switches $A_0$ and $A_1$ are set equal to 1 to provide a current attenuation ratio of 1/64. To achieve no attenuation, binary signals $B_0$–$B_3$ are set equal to 1 and binary signals $A_0$ and $A_1$ are set equal to 0 to provide for a current attenuation ratio of 1. It should be appreciated that switch control signals SW1–SW6 may be selected in various combinations to provide variable attenuation as needed. It should also be appreciated that a ratio greater than 1 can be achieved to provide amplification, without departing from the spirit of the present invention.

The variable attenuation circuit 24 of the present invention provides current attenuation by sequentially switching out the current sourcing branches made up of transistors in the current attenuation circuit, or by increasing the amplifier transistors so as to reduce the size ratio of current sourcing transistors to the amplifier transistors. The advantage to reducing the amplifier transistors is to minimize quiescent current in the amplifier under normal operation. By using current mode, the external input circuit of the present invention requires only two resistors, which simplifies the external circuitry and eliminates false conditions associated with input resistor dividers. In addition, input voltage handling ability is easily scaled by changing the input resistor pair and the circuit area is significantly reduced because the current sourcing circuit contains no resistors, and the transistors can be scaled to maintain the device voltage in the saturation region. The transistors employed herein are relatively small and preferably square, which is optimal for matching and area considerations. Accordingly, the current mode variable attenuation circuit 24 provides enhanced matching, reduced transistor area, and simplified external circuitry.

Rectifier and Differential to Single-Ended Conversion Circuit

Referring to FIG. 5, a rectifier and differential-to-single-ended conversion circuit 32 is illustrated for converting the variably attenuated current signals $I_{OUT\ A}$ and $I_{OUT\ B}$ to a single-ended voltage output $V_{OUT}$. Conversion circuit 32 includes a first switch (SW1) 304 controlled by zero cross output signal CLKB and a second switch (SW2) 306 controlled by zero cross output signal CLK. Zero cross signal CLKB is the negative of signal CLK. Switch 304 is coupled to an input for receiving the positive current $I_{OUT\ A}$, while switch 306 is coupled to an input for receiving the negative current $I_{OUT\ B}$. The output of switches 304 and 306 are commonly tied to an inverting (−) input of amplifier 308. Similarly, conversion circuit 32 further includes switch (SW3) 316 which is controlled in response to zero cross output signal CLKB, and switch (SW4) 318 which is controlled in response to zero cross output signal CLK. Switch 316 is coupled to the input for receiving the negative current $I_{OUT\ B}$, while switch 318 is coupled to the input for receiving the positive current $I_{OUT\ A}$. Switches 316 and 318 are commonly tied to the inverting (−) input of amplifier 320.

The amplifiers 308 and 320 provide rectification as explained herein. Both amplifiers 308 and 320 have a non-inverting input (+) tied to a voltage reference VREF which may be equal to $V_{DD}/2$ volts, which according to one example is equal to 2.5 volts. Amplifier 320 amplifies either the positive current $I_{OUT\ A}$ or the negative current $I_{OUT\ B}$ as selected via switches 316 and 318 to provide a full-wave rectification voltage V at one-half gain at node 322. Node 322 is tied back to the inverting input (−) of amplifier 320 via resistor 314 and is further tied to the inverting input (−) of amplifier 308 via resistor 312.

Amplifier 308 sums the voltage provided at its non-inverting input (+) and provides, in effect, a full-wave rectification output voltage $V_{OUT}$ at its output node 78. In addition, output s node 78 is tied back to the inverting input (−) of amplifier 308 via resistor 302. Further, the inverting input (−) of amplifier 308 is tied to rail voltage $V_{DD}$ via resistor 300.

In operation, the conversion circuit 32 receives the positive and negative variably attenuated current signals $I_{OUT\ A}$ and $I_{OUT\ B}$, which are applied to amplifiers 308 and 320, depending upon the amplitude relative to each other. More particularly, currents $I_{OUT\ A}$ and $I_{OUT\ B}$ are controllably selected in response to the zero cross output signals CLK and CLKB. Zero cross output signals CLK and CLKB are determined by a comparison of the polarity signals SW+ and SW−, which provide polarity information about the input signal. In effect, polarity signals SW+ and SW− are applied to the positive and negative terminals of a comparator, and the CLK output of the comparator is high when the polarity signal SW+ signal is greater in voltage than the negative polarity signal SW−. The zero cross output signal CLKB is the negative of signal CLK.

The negative current signal $I_{OUT\ B}$ is applied through switch 306 to the negative terminal of amplifier 308 when zero cross output signal CLK is high. When signal CLK is high, the negative current $I_{OUT\ B}$ is negative, and the voltage output $V_{OUT}$ is headed in the positive direction. In effect, the gain of the signal is equal to the negative current $I_{OUT\ B}$ multiplied by resistor 302. When zero cross output signal CLKB is high, the positive current $I_{OUT\ A}$ signal is applied to the negative terminal of amplifier 308. This causes the output voltage $V_{OUT}$ to head in the positive direction, thereby creating a rectifier. The inverse condition occurs at the negative terminal of amplifier 320, thereby creating a negative rectifier at the output. The gain of the signal is equal to the negative current $I_{OUT\ B}$ multiplied by resistor 314. The output of amplifier 320 is applied through resistor 312 to the negative terminal of amplifier 308. This sums the first and second stage signals to create the desired full-wave rectified voltage signal $V_{OUT}$ at output node 78. An additional resistor 300 is tied between the rail voltage $V_{DD}$ and the negative terminal of amplifier 308 to force the nominal DC reference of the output to ground.

Resistors 300 and 302 are preferably equal and nominally equal to an input resistor of 100 K ohms. Resistors 312 and 314 are preferably equal and nominally equal to one-half the input resistor. This minimizes the voltage swing on amplifier 320 and the area devoted to resistance. The gain is the same overall. The first stage provides a gain of the positive current $I_{OUT\ A}$ or the negative current $I_{OUT\ B}$ multiplied by resistor 314 times the second stage gain of the ratio of resistor 302 to resistor 312. Because resistor 314 equals resistor 312, the gain is equal to the positive or negative currents $I_{OUT\ A}$ or $I_{OUT\ B}$ multiplied by resistor 302, which is the same as the second stage of gain alone.

In both amplifiers 308 and 320, the positive terminal is referenced to $V_{DD}/2$ volts. This forces the DC voltage corresponding to the positive current $I_{OUT\ A}$ and negative current $I_{OUT\ B}$ to be maintained at $V_{DD}/2$ volts, and thereby optimizes the matching of the current steering circuitry in the variable attenuator circuit 24, as previously discussed.

The rectified voltages V and $V_{OUT}$ output from respective amplifiers 320 and 308 are illustrated in FIGS. 6A and 6B, according to one example. The voltage V in FIG. 6A is full-wave rectification of currents $I_{OUT\ A}$ and $I_{OUT\ B}$ converted to voltage at one-half gain and referenced to $V_{DD}/2$ volts. The voltage $V_{OUT}$ shown in FIG. 6B is full-wave rectification of the currents $I_{OUT\ A}$ and $I_{OUT\ B}$ converted to voltage at full-gain and referenced to ground. The rectified output voltage $V_{OUT}$ is then output on line 78 to the adaptive threshold circuit 36 and processed as discussed herein.

It will be understood by those who practice the invention and those skilled in the art, that various modifications and improvements may be made to the invention without departing from lo the spirit of the disclosed concept. The scope of protection afforded is to be determined by the claims and by the breadth of interpretation allowed by law.

What is claimed is:

1. A conversion circuit for converting a differential voltage that is produced by a magnetic sensor in response to rotation of a wheel to a single-ended voltage that provides rotational speed information about the wheel, comprising:

an input circuit including first and second input lines for receiving a differential voltage;

an attenuation circuit for converting said differential voltage to a differential current and attenuating the differential current when the differential current exceeds a predetermined value; and a rectification circuit for converting said differential current to a single-ended output voltage, wherein said rectification circuit includes a first amplifier and a second amplifier and wherein said first amplifier provides full-wave rectification at a partial gain and said second amplifier provides full-wave rectification at full gain.

2. The conversion circuit as defined in claim 1, wherein said attenuated differential current includes a positive current signal and a negative current signal.

3. The conversation circuit as defined in claim 2, wherein said first amplifier receives one of said positive and negative current signals at a time, and said second amplifier receives the other of said positive and negative current signals.

4. The conversion circuit as defined in claim 3, wherein selection of said one of the positive and negative current signals is controlled in response to comparative values of said positive and negative current signals.

5. An apparatus for developing a series of voltage pulses that are developed during rotation of a wheel comprising:

a magnetic sensor associated with said wheel and having a pick-up coil with first and second coil outputs and means for causing an alternating differential voltage to be generated in said pick-up coil when said wheel rotates relative to said sensor;

an input circuit including first and second input lines connected respectively to said first and second coil outputs of the pick-up coil for receiving said differential voltage;

an attenuation circuit for converting said differential voltage to a differential current and attenuating the differential current when the differential exceeds a predetermined value;

a conversion circuit for receiving said differential current and for converting said differential current to a single-ended voltage; and an adaptive threshold circuit coupled to the output of said conversion circuit for producing said series of voltage pulses in response to the single-ended voltage output.

6. The apparatus as defined in claim 5, wherein said conversion circuit includes first and second amplifiers.

7. The apparatus as defined in claim 6, wherein said first amplifier provides full-wave rectification at a partial gain of said differential current, and said second amplifier provides full-wave rectification at full gain as the single-ended output voltage.

8. The apparatus as defined in claim 6, wherein said attenuated differential current includes a positive current signal and a negative current signal.

9. The apparatus as defined in claim 8, wherein said first amplifier receives one of said positive and negative current signals at a time, and said second amplifier receives the other of said positive and negative current signals.

10. The apparatus as defined in claim 9, wherein selection of said one of said positive and negative current signals is controlled in response to comparative values of said positive and negative current signals.

11. An apparatus for developing a series of voltage pulses that are developed during rotation of a wheel comprising:

a magnetic sensor associated with said wheel and having a pick-up coil with first and second coil outputs and means for causing an alternating differential voltage to be generated in said pick-up coil when said wheel rotates relative to said sensor;

an input circuit including first and second input lines connected respectively to said first and second coil outputs of the pick-up coil for receiving said differential voltage;

an attenuation circuit for converting said differential voltage to a differential current having positive and negative current signals and attenuating the differential current when the differential current exceeds a predetermined value;

a conversion circuit including first and second amplifiers, said first amplifier receiving a one of said positive and negative current signals and providing rectification thereof, said second amplifier receiving the other of said positive and negative current signals and providing rectification thereof, said conversion circuit further summing the rectification output from said first and second amplifiers to provide said single-ended voltage; and an adaptive threshold circuit coupled to the output of said conversion circuit for producing said series of voltage pulses in response to the single-ended voltage output.

* * * * *